United States Patent
Bergdahl et al.

(10) Patent No.: US 6,290,067 B1
(45) Date of Patent: Sep. 18, 2001

(54) SCREENING APPARATUS WITH DILUTION LIQUID SUPPLY MEANS

(75) Inventors: Anders Bergdahl; Kjell Forslund, both of Sundsbruk; Lennart Svensson; Björn Wikström, both of Sundsvall, all of (SE)

(73) Assignee: Valmet Fibertech Aktiebolag (SE)

( * ) Notice: Subject to any disclaimer, the term of this patent is extended or adjusted under 35 U.S.C. 154(b) by 0 days.

(21) Appl. No.: 09/402,916

(22) PCT Filed: Apr. 8, 1998

(86) PCT No.: PCT/SE98/00650

§ 371 Date: Oct. 13, 1999

§ 102(e) Date: Oct. 13, 1999

(87) PCT Pub. No.: WO98/46821

PCT Pub. Date: Oct. 22, 1998

(30) Foreign Application Priority Data

Apr. 14, 1997 (SE) .................................................. 9701368

(51) Int. Cl.⁷ .................................. B07B 1/04; B03B 5/28
(52) U.S. Cl. .......................... 209/273; 209/724; 209/725; 209/731; 209/283; 209/284
(58) Field of Search .............................. 209/17, 273, 283, 209/284, 300, 305, 306, 724, 725, 730, 731

(56) References Cited

U.S. PATENT DOCUMENTS

| | | | |
|---|---|---|---|
| 3,713,536 | * | 1/1973 | Hooper ................................. 209/273 |
| 4,267,035 | * | 5/1981 | Martin ................................. 209/273 |
| 4,749,474 | | 6/1988 | Young ......................................... 1/4 |
| 4,851,111 | * | 7/1989 | Martin et al. ........................ 209/304 |
| 5,096,127 | * | 3/1992 | Young ............................... 241/46.17 |
| 5,925,249 | | 7/1999 | Fredriksson ................................ 1/20 |

FOREIGN PATENT DOCUMENTS

| | | | |
|---|---|---|---|
| 0 649 940 A1 | 4/1995 | (EP) | ............................................ 5/2 |
| 507 905 C2 | 4/1997 | (SE) | ............................................ 5/2 |
| 93/23609 A1 | 11/1993 | (WO) | ............................................ 5/2 |

OTHER PUBLICATIONS

European Patent Application (Publication No: 0 649 940 A1); Application No.: 94307610; Publication Date: Apr. 26, 1995; Applicant: Ishikawajima).*

* cited by examiner

Primary Examiner—Donald P. Walsh
Assistant Examiner—Joseph Rodriguez
(74) Attorney, Agent, or Firm—Lerner, David, Littenberg, Krumholz & Mentlik, LLP

(57) ABSTRACT

Screening apparatus is disclosed for separating fiber suspensions comprising a housing having an inlet for the fiber suspension, a stationary tubular screen dividing the interior of the housing into a central chamber for receiving the fiber suspension from the inlet and an outer accept chamber for receiving an accept portion of the fiber suspension which has passed through the stationary tubular screen, a rotor journalled on the housing for rotation within the central chamber coaxially with the stationary tubular screen, the rotor including a rotationally symmetrical element, a reject chamber for receiving a reject portion of the fiber suspension at one end of the stationary tubular screen, and an annular passage for dilution liquid including a stationary annular wall portion juxtaposed with the rotationally symmetrical element of the rotor.

7 Claims, 1 Drawing Sheet

SCREENING APPARATUS WITH DILUTION LIQUID SUPPLY MEANS

The present invention relates to a screening apparatus for separating fibre suspensions, comprising a housing, an inlet to the interior of the housing for a fibre suspension to be separated, a stationary tubular screen dividing the interior of the housing into a central chamber for receiving the fibre suspension from the inlet at one end of the tubular screen and an outer accept chamber for receiving an accept fraction of the fibre suspension, which has passed through the screen, a rotor journalled on the housing and situated in the central chamber coaxially with the tubular screen, and a reject chamber for receiving a developed reject fraction from the other end of the screen. The apparatus further comprises dilution liquid supply means for supplying dilution liquid the central chamber.

Such an apparatus is generally used for separating paper pulp suspensions, for instance for fractionating fibres or for separating contaminants and other undesirable particles, such as incompletely treated fibres. A well-known problem in connection with the separation of a pulp suspension by this type of apparatus is that the pulp suspension in the central chamber has a higher fibre concentration relatively close to the reject passage than relatively close to the end of the tubular screen where the pulp suspension to be separated enters the screen. This is due to the fact that the liquid, usually water, in the pulp suspension easily separates through the screen immediately after having entered the tubular screen. As a consequence the developed reject fraction is thickened in the vicinity of the reject passage. This thickening of the reject fraction is further increased if just a relatively small flow of the reject fraction is allowed to escape through the reject passage. A too large thickening of the reject fraction gives rise to torque transmission between the rotor and the screen via the thickened reject fraction, which results in an increased energy consumption for rotating the rotor. The rotor might even get stuck to the screen, which requires a costly production break for manual cleaning of the rotor and the screen. The thickened reject fraction might also be difficult to discharge through the usually narrow reject passage and further through a valve situated outside of the apparatus.

U.S. Pat. No. 4,749,474 discloses an apparatus of the above described type in which the dilution liquid supply means is adapted to pump dilution liquid from a reject chamber of the apparatus into the central chamber against the flow of developed reject fraction, to counteract the thickening of the suspension along the screen. A disadvantage of this known apparatus is that the apparatus produces a final reject fraction that has an unsatisfactorily low consistency, because the reject fraction is mixed with a significant volume of dilution liquid in said reject chamber.

WO 93/23609 discloses another apparatus of this type in which the dilution liquid supply means comprise a complex pipe system arranged on the rotor for rotating therewith while flushing jets of dilution liquid through pipe openings against the screen. However, it has been proved that such dilution liquid openings on the rotor often are clogged with fibres with the consequence that the operation of the apparatus has to be interrupted for cleansing of said openings and removal of thickened reject fraction deposited on the screen.

The object of the present invention is to provide a screening apparatus with reliable dilution liquid supply means, which insignificantly affect the consistency of the final reject fraction.

This object is achieved by an apparatus of the type described initially, which is characterized in that the dilution liquid supply means comprise a rotationally symmetrical element of the rotor and an opposite stationary annular wall portion, said element and wall portion defining an annular passage for the dilution liquid. Since said rotor element moves along the stationary annular wall portion during operation of the screening apparatus, any particles present in the annular passage will be subjected to shearing actions by the rotating rotor element, which significantly reduces the risk of the annular passage being clogged with fibres or contaminants.

To further reduce said clogging risk, the rotationally symmetrical element may be provided with at least one protrusion, which extends in the annular passage but is spaced from the stationary wall portion. During each revolution of the rotor the protrusion will push away any particles present in the annular passage. As an alternative, or in combination with said protrusion, the axial width of the annular passage may vary in the circumferential direction, so that the liquid present in the annular passage will be subjected to a pulsating action by the rotor element during operation.

The annular passage suitably opens into the tubular screen, preferably at a distance from said other end of the screen which is about 5–50% of the axial length of the screen. As a result, the dilution liquid can directly flush the desired location of the screen, so that no excessive volume of dilution liquid is supplied to the central chamber.

According to a preferred embodiment of the invention, the rotor comprises a circumferential wall and a radial wall connected to an end of the circumferential wall, the rotationally symmetrical element forming part of said radial wall. The dilution liquid supply means comprises a stationary circumferential wall in flush with the circumferential wall of the rotor and connected to the stationary annular wall portion, the stationary circumferential wall and annular wall portion defining a dilution liquid chamber in fluid communication with the annular passage. To provide favourable flow conditions in the central chamber, the circumferential walls of the rotor and the liquid supply chamber taper in the direction toward said one end of the screen. As a result, the above preferred embodiment comprises a simple inexpensive and reliable dilution liquid supply means.

The invention is described in more detail in the following with reference to the accompanying drawing, in which FIG. 1 is a longitudinal cross-section through a schematic screening apparatus according to a preferred embodiment of the invention, FIG. 2 shows an enlarged encircled detail in FIG. 1, and FIG. 3 is a view along line III—III in FIG. 2.

In FIG. 1 there is shown a screening apparatus 1 of the invention comprising a generally cylindrical housing 2 with an inlet 3 for a fibre suspension to be separated, and a cylindrical screen 4 secured to the housing 2 and dividing the interior of the housing 2 into a central chamber 5 for receiving the fibre suspension from the inlet 3 at one end of the cylindrical screen 4 and an annular outer accept chamber 6 for receiving an accept fraction of the fibre suspension, which has passed through the screen 4. A rotor 7 provided with a number of circumferentially distributed peripheral wing elements 8 is journalled by bearings 9 on the housing 2 and positioned in the central chamber 5 coaxially with the cylindrical screen 4, so that the wing elements 8 sweep past the interior surface of the screen 4, when the rotor 7 is rotated by a drive motor (not shown). The housing 2 is provided with an accept outlet 10 for discharging the accept fraction from the accept chamber 6 and a reject outlet 11 for discharging the developed reject fraction from the interior of the screen 4 via a reject chamber 12 communicating with the central chamber 5.

The rotor 7 has a truncated conical circumferential wall 13 and a radial wall 14 connected thereto at the base of the conical wall 13. At the connection between the walls 13 and 14, a part of the radial wall 14 is formed by a rotationally symmetrical wall element 15 of the rotor 7.

A stationary truncated conical wall 16, which is coaxial and flush with the conical wall 13 of the rotor 7, defines a dilution liquid chamber 17 with an inlet 18. At the apex end of the conical wall 16 an annular wall portion 19 extends radially inwardly from the conical wall 16 adjacent the wall element 15 of the rotor 7, so that a narrow annular passage 20 is defined between the wall element 15 and the wall portion 19. The wall element 15 of the rotor 7 is provided with at least one protrusion 21, which extends in the annular passage 20 but is spaced from the stationary wall portion 19. The annular passage 20 opens into the tubular screen 4 relatively close to the reject chamber 12. To achieve a satisfactory dilution of thickened reject fraction, the passage 20 should open into the screen 4 at a distance from the reject discharging end of the screen 4 which is about 5–50% of the axial length of the screen 4.

Thus, the screening apparatus is provided with dilution liquid supply means comprising the above defined wall element 15, stationary circumferential wall 16, dilution liquid chamber 17 with its inlet 18, annular wall portion 19 and annular passage 20.

In operation, the fibre suspension to be separated is supplied to the central chamber 5 through the inlet 3 and flows along the screen 4 while separating into an accept fraction, which passes through the screen 4 into the accept chamber 6 and discharges therefrom through the accept outlet 10, and a reject fraction, which flows from the screen 4 into the reject chamber 12 and discharges therefrom through the reject outlet 11. By pulsating action of the rotating wing elements 8 the screen 4 is prevented from being clogged by fibres and/or contaminants. Dilution liquid, usually water, is supplied to the dilution liquid chamber 17 via the inlet 18. From chamber 17 the dilution liquid flows past the annular wall portion 19 and through the annular passage 20 flushing the screen 4, so that detrimental thickening of the reject fraction is prevented.

The annular passage 20 is kept clean by the rotation of the wall element 15 subjecting any particles present in the annular passage 20 to shearing actions. In addition to this, the protrusion 21 on the rotor 7 pushes away any particles present in the annular passage 20 during each revolution of the rotor 7.

What is claimed is:

1. A screening apparatus for separating fiber suspensions comprising:

a housing including an interior and an inlet for said fiber suspension;

a stationary tubular screen having a first end, a second end, and an axial length therebetween dividing said interior of said housing into a central chamber for receiving said fiber suspension from said inlet and an outer accept chamber for receiving an accept portion of said fiber suspension which has passed through said stationary tubular screen;

a rotor journalled on said housing for rotation within said central chamber coaxially with said stationary tubular screen, said rotor including a rotationally symmetrical element;

a reject chamber for receiving a reject portion of said fiber suspension at said second end of said stationary tubular screen; and dilution liquid supply means for supplying a dilution liquid to said central chamber, said dilution liquid supply means including a stationary annular wall portion extending in the radial direction and juxtaposed with said rotationally symmetrical element of said rotor thereby defining an annular passage for said dilution liquid, said stationary annular wall portion being spaced from said second end of said stationary tubular screen.

2. The screening apparatus of claim 1 wherein said annular passage faces said stationary tubular screen.

3. The screening apparatus of claim 2 wherein said annular passage faces said stationary tubular screen at a location spaced from said second end of said stationary tubular screen which corresponds to a distance between about 5% and 50% of said axial length of said stationary tubular screen.

4. The screening apparatus of claim 1 including a stationary circumferential wall substantially comprising an extension of said circumferential wall of said rotor, said stationary circumferential wall including said stationary annular wall portion, said stationary circumferential wall and said stationary annular wall portion defining a dilution liquid chamber in fluid communication with said annular passage.

5. The screening apparatus of claim 4 wherein said circumferential wall of said rotor and said stationary circumferential wall of said dilution liquid chamber are tapered in a direction toward said first end of said stationary tubular screen.

6. The screening apparatus of claim 1 wherein said rotationally symmetrical element includes at least one protrusion extending into said annular passage spaced from said stationary annular wall portion.

7. The screening apparatus of claim 1 wherein said annular passage includes an axial width, and wherein said axial width varies in a circumferential direction.

* * * * *

UNITED STATES PATENT AND TRADEMARK OFFICE
CERTIFICATE OF CORRECTION

PATENT NO. : 6,290,067 B1  
DATED : September 18, 2001  
INVENTOR(S) : Bergdahl et al.

It is certified that error appears in the above-identified patent and that said Letters Patent is hereby corrected as shown below:

<u>Column 4,</u>  
Line 12, after "element" insert -- and a circumferential wall having a first end and a second end and a radially extending wall connected to said second end of said circumferential wall, said rotationally symmetrical element comprising a portion of said radially extending wall --  
Line 15, delete "and" and insert -- a stationary circumferential wall adjacent said radially extending wall; and --  
Line 19, after "portion" insert -- on said stationary circumferential wall, said stationary wall portion --  
Line 19, after "direction and" insert -- being --  
Line 21, after "for" insert -- supplying --  
Line 23, after "liquid" insert -- through said annular passage --

Signed and Sealed this

Twenty-fifth Day of June, 2002

Attest:

JAMES E. ROGAN  
*Attesting Officer*     *Director of the United States Patent and Trademark Office*

UNITED STATES PATENT AND TRADEMARK OFFICE
CERTIFICATE OF CORRECTION

PATENT NO. : 6,290,067 B1
DATED : September 18, 2001
INVENTOR(S) : Anders Bergdahl et al.

It is certified that error appears in the above-identified patent and that said Letters Patent is hereby corrected as shown below:

Delete the title page and substitute therefore attached title page.

Delete the specification and substitute therefore attached specification.

Signed and Sealed this

Tenth Day of June, 2003

JAMES E. ROGAN
*Director of the United States Patent and Trademark Office*

(12) United States Patent
Bergdahl et al.

(10) Patent No.: US 6,290,067 B1
(45) Date of Patent: Sep. 18, 2001

(54) SCREENING APPARATUS WITH DILUTION LIQUID SUPPLY MEANS

(75) Inventors: Anders Bergdahl; Kjell Forslund, both of Sundsbruk; Lennart Svensson; Björn Wikström, both of Sundsvall, all of (SE)

(73) Assignee: Valmet Fibertech Aktiebolag (SE)

(*) Notice: Subject to any disclaimer, the term of this patent is extended or adjusted under 35 U.S.C. 154(b) by 0 days.

(21) Appl. No.: 09/402,916
(22) PCT Filed: Apr. 8, 1998
(86) PCT No.: PCT/SE98/00650
  § 371 Date: Oct. 13, 1999
  § 102(e) Date: Oct. 13, 1999
(87) PCT Pub. No.: WO98/46821
  PCT Pub. Date: Oct. 22, 1998

(30) Foreign Application Priority Data

Apr. 14, 1997 (SE) .................................. 9701368

(51) Int. Cl.$^7$ ............................. B07B 1/04; B03B 5/28
(52) U.S. Cl. ............. 209/273; 209/724; 209/725; 209/731; 209/283; 209/284
(58) Field of Search .................... 209/17, 273, 283, 209/284, 300, 305, 306, 724, 725, 730, 731

(56) References Cited

U.S. PATENT DOCUMENTS

| | | | |
|---|---|---|---|
| 3,713,536 | * 1/1973 | Hooper | 209/273 |
| 4,267,035 | * 5/1981 | Martin | 209/273 |
| 4,749,474 | 6/1988 | Young | 1/4 |
| 4,851,111 | * 7/1989 | Martin et al. | 209/304 |
| 5,096,127 | * 3/1992 | Young | 241/46.17 |
| 5,925,249 | 7/1999 | Fredriksson | 1/20 |

FOREIGN PATENT DOCUMENTS

| | | | |
|---|---|---|---|
| 0 649 940 A1 | 4/1995 | (EP) | 5/2 |
| 507 905 C2 | 4/1997 | (SE) | 5/2 |
| 93/23609 A1 | 11/1993 | (WO) | 5/2 |

OTHER PUBLICATIONS

European Patent Application (Publication No.: 0 649 940 A1); Application No.: 94307610; Publication Date: Apr. 26, 1995; Applicant: Ishikawajima).*

* cited by examiner

Primary Examiner—Donald P. Walsh
Assistant Examiner—Joseph Rodriguez
(74) Attorney, Agent, or Firm—Lerner, David, Littenberg Krumholz & Mentlik, LLP

(57) ABSTRACT

Screening apparatus is disclosed for separating fiber suspensions comprising a housing having an inlet for the fiber suspension, a stationary tubular screen dividing the interior of the housing into a central chamber for receiving the fiber suspension from the inlet and an outer accept chamber for receiving an accept portion of the fiber suspension which has passed through the stationary tubular screen, a rotor journalled on the housing for rotation within the central chamber coaxially with the stationary tubular screen, the rotor including a rotationally symmetrical element, a reject chamber for receiving a reject portion of the fiber suspension at one end of the stationary tubular screen, and an annular passage for dilution liquid including a stationary annular wall portion juxtaposed with the rotationally symmetrical element of the rotor.

7 Claims, 1 Drawing Sheet

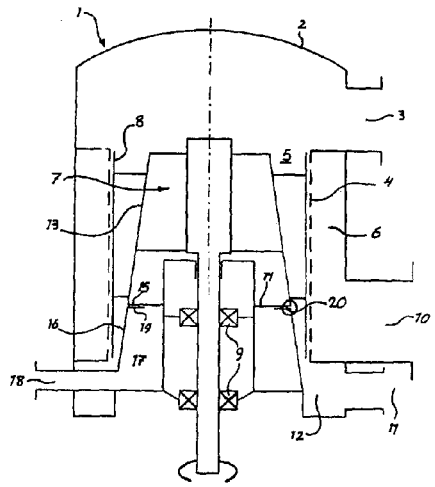

SCREENING APPARATUS WITH DILUTION LIQUID SUPPLY MEANS

FIELD OF THE INVENTION

The present invention relates to a screening apparatus for separating fiber suspensions, comprising a housing, an inlet to the interior of the housing for a fiber suspension to be separated, a stationary tubular screen dividing the interior of the housing into a central chamber for receiving the fiber suspension from the inlet at one end of the tubular screen and an outer accept chamber for receiving an accept fraction of the fiber suspension, which has passed through the screen, a rotor journalled on the housing and situated in the central chamber coaxially with the tubular screen, and a reject chamber for receiving a developed reject fraction from the other end of the screen. The present invention further relates to such apparatus including dilution liquid supply means for supplying dilution liquid the central chamber.

BACKGROUND OF THE INVENTION

The apparatus described above is generally used for separating paper pulp suspensions, such as for fractionating fibers or for separating contaminants and other undesirable particles, such as incompletely treated fibers. A well-known problem in connection with the separation of a pulp suspension by this type of apparatus is that the pulp suspension in the central chamber has a higher fiber concentration relatively close to the reject passage than it does relatively close to the end of the tubular screen where the pulp suspension to be separated enters the screen. This is due to the fact that the liquid, usually water, in the pulp suspension readily separates through the screen immediately after having entered the tubular screen. As a consequence, the developed reject fraction is thickened in the vicinity of the reject passage. This thickening of the reject fraction is further increased if only a relatively small flow of the reject fraction is permitted to escape through the reject passage. Too large a thickening of the reject fraction gives rise to torque transmission between the rotor and the screen through the thickened reject fraction, which results in an increased energy consumption for rotating the rotor. The rotor can even become affixed to the screen, which requires a costly production break for manual cleaning of the rotor and the screen. The thickened reject fraction can also be difficult to discharge through the usually narrow reject passage and further through a valve situated outside of the apparatus.

U.S. Pat. No. 4,749,474 discloses an apparatus of the above-described type in which the dilution liquid supply means is adapted to pump dilution liquid from a reject chamber of the apparatus into the central chamber against the flow of developed reject fraction, to counteract the thickening of the suspension along the screen. A disadvantage of this known apparatus is that the apparatus produces a final reject fraction that has an unsatisfactorily low consistency, because the reject fraction is mixed with a significant volume of dilution liquid in the reject chamber.

WO 93/23609 discloses another apparatus of this type in which the dilution liquid supply means comprises a complex pipe system arranged on the rotor for rotating therewith while flushing jets of dilution liquid through pipe openings against the screen. However, it has been shown that such dilution liquid openings on the rotor are often clogged with fibers with the consequence that the operation of the apparatus has to be interrupted for cleansing of these openings and removal of thickened reject fraction deposited on the screen.

The object of the present invention is thus to provide a screening apparatus with reliable dilution liquid supply means, which insignificantly affect the consistency of the final reject fraction.

SUMMARY OF THE INVENTION

In accordance with the present invention, these and other objects have now been realized by the invention of a screening apparatus for separating fiber suspensions comprising a housing including an interior and an inlet for the fiber suspension, a stationary tubular screen having a first end, a second end, and an axial length therebetween dividing the interior of the housing into a central chamber for receiving the fiber suspension from the inlet and an outer accept chamber for receiving an accept portion of the fiber suspension which has passed through the stationary tubular screen, a rotor journalled on the housing for rotation within the central chamber coaxially with the stationary tubular screen, the rotor including a rotationally symmetrical element, a reject chamber for receiving a reject portion of the fiber suspension at the second end of the stationary tubular screen, and dilution liquid supply means for supplying a dilution liquid to the central chamber, the dilution liquid supply means including a stationary annular wall portion juxtaposed with the rotationally symmetrical element of the rotor thereby defining an annular passage for the dilution liquid. Preferably, the annular passage faces the stationary tubular screen.

In accordance with a preferred embodiment of screening apparatus of the present invention, the annular passage faces the stationary tubular screen at a location spaced from the second end of the stationary tubular screen which corresponds to a distance between about 5% and 50% of the axial length of the stationary tubular screen.

In accordance with another embodiment of the screening apparatus of the present invention, the rotor comprises a circumferential wall having a first end and a second end and a radial wall connected to the second end of the circumferential wall, the rotationally symmetrical element comprising a portion of the radial wall. In a preferred embodiment, the apparatus includes a stationary circumferential wall substantially comprising an extension of the circumferential wall of the rotor, the stationary circumferential wall including the stationary annular wall portion, the stationary circumferential wall and the stationary annular wall portion defining a dilution liquid chamber in fluid communication with the annular passage. In a preferred embodiment, the circumferential wall of the rotor and the stationary circumferential wall of the dilution liquid chamber are tapered in a direction toward the first end of the stationary tubular screen.

In accordance with one embodiment of the screening apparatus of the present invention, the rotationally symmetrical element includes at least one protrusion extending into the annular passage spaced from the stationary annular wall portion.

In accordance with another embodiment of the screening apparatus of the present invention, the annular passage includes an axial width, and the axial width varies in a circumferential direction.

The objects of the present invention are achieved by an apparatus of the type described above, which include dilution liquid supply means comprising a rotationally symmetrical element of the rotor and an opposite stationary annular wall portion, the rotationally symmetrical element and wall portion defining an annular passage for the dilution liquid. Since the rotor element moves along the stationary annular wall portion during operation of the screening apparatus, any particles present in the annular passage will be subjected to shearing actions by the rotating rotor element, which significantly reduces the risk of the annular passage being clogged with fibers or contaminants.

To further reduce the risk of clogging, the rotationally symmetrical element may be provided with at least one protrusion, which extends in the annular passage but is spaced from the stationary wall portion. During each revolution of the rotor the protrusion will push away any particles present in the annular passage. As an alternative, or in combination with such a protrusion, the axial width of the annular passage may vary in the circumferential direction, so that the liquid present in the annular passage will be subjected to a pulsating action by the rotor element during operation.

The annular passage preferably opens into the tubular screen, preferably at a distance from the other end of the screen which is about 5% to 50% of the axial length of the screen. As a result, the dilution liquid can directly flush the desired location of the screen, so that no excessive volume of dilution liquid is supplied to the central chamber.

According to a preferred embodiment of the present invention, the rotor comprises a circumferential wall and a radial wall connected to an end of the circumferential wall, the rotationally symmetrical element forming part of that radial wall. The dilution liquid supply means comprises a stationary circumferential wall which is flush with the circumferential wall of the rotor and is connected to the stationary annular wall portion, the stationary circumferential wall and annular wall portion defining a dilution liquid chamber in fluid communication with the annular passage. To provide favorable flow conditions in the central chamber, the circumferential walls of the rotor and the liquid supply chamber taper in the direction toward the one end of the screen. As a result, the above preferred embodiment comprises a simple, inexpensive and reliable dilution liquid supply means.

BRIEF DESCRIPTION OF THE DRAWINGS

The present invention is described in more detail in the following detailed description, which, in turn, refers to the accompanying drawings, in which.

DETAILED DESCRIPTION

Figure 1:
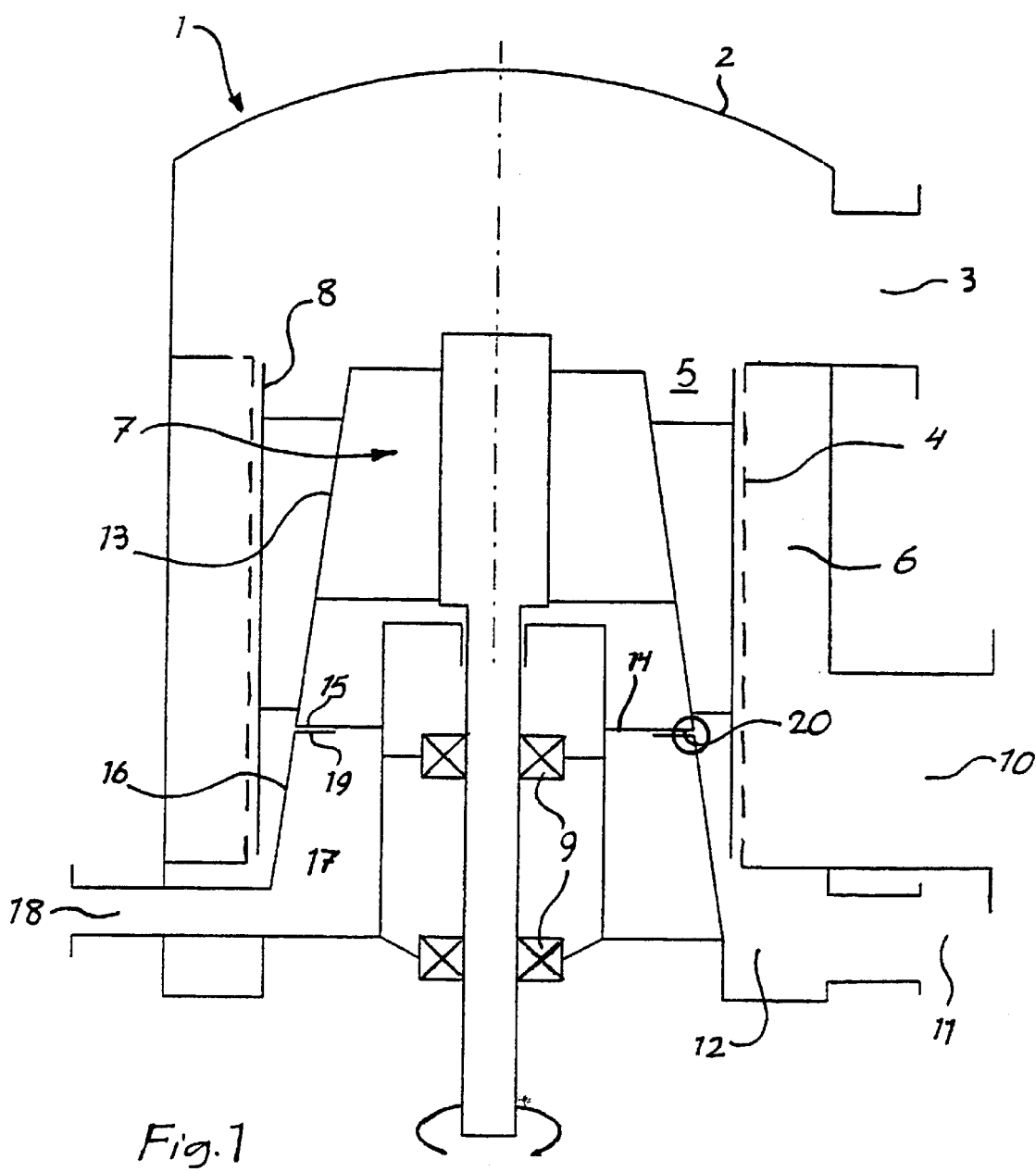
FIG. 1 is a side, elevational, cross-sectional, partially schematic view of screening apparatus according to a preferred embodiment of the invention.
Figures 2, 3:
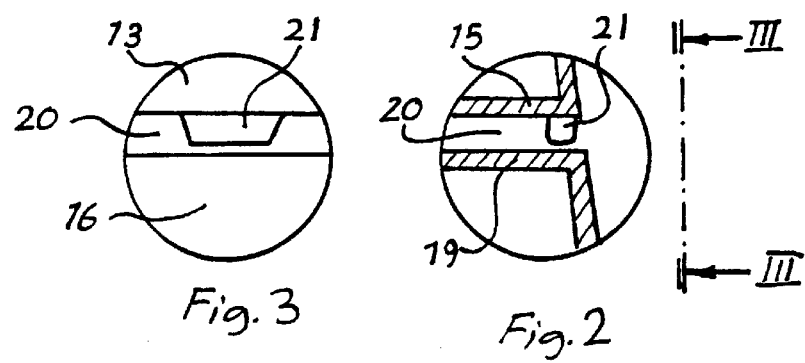
FIG. 2 is a side, elevational, cross-sectional view of the enlarged encircled detail shown in FIG. 1.
FIG. 3 is a front, elevational view taken along line III—III in FIG. 2.

In FIG. 1 there is shown a screening apparatus 1 of the present invention comprising a generally cylindrical housing 2 with an inlet 3 for a fiber suspension which is to be separated, and a cylindrical screen 4 secured to the housing 2 and dividing the interior of the housing 2 into a central chamber 5 for receiving the fiber suspension from the inlet 3 at one end of the cylindrical screen 4 and an annular outer accept chamber 6 for receiving an accept fraction of the fiber suspension, which has passed through the screen 4. A rotor 7 provided with a number of circumferentially distributed peripheral wing elements 8 is journalled by bearings 9 on the housing 2 and positioned in the central chamber 5 coaxially with the cylindrical screen 4, so that the wing elements 8 sweep past the interior surface of the screen 4, when the rotor 7 is rotated by a drive motor (not shown). The housing 2 is provided with an accept outlet 10 for discharging the accept fraction from the accept chamber 6 and a reject outlet 11 for discharging the developed reject fraction from the interior of the screen 4 through a reject chamber 12 communicating with the central chamber 5.

The rotor 7 has a truncated conical circumferential wall 13 and a radial wall 14 connected thereto at the base of the conical wall 13. At the connection between the walls 13 and 14, a part of the radial wall 14 is formed by a rotationally symmetrical wall element 15 of the rotor 7.

A stationary truncated conical wall 16, which is coaxial and flush with the conical wall 13 of the rotor 7, defines a dilution liquid chamber 17 with an inlet 18. At the apex end of the conical wall 16 an annular wall portion 19 extends radially inwardly from the conical wall 16 adjacent the wall element 15 of the rotor 7, so that a narrow annular passage 20 is defined between the wall element 15 and the wall portion 19. The wall element 15 of the rotor 7 is provided with at least one protrusion 21, which extends in the annular passage 20 but is spaced from the stationary wall portion 19. The annular passage 20 opens into the tubular screen 4 relatively close to the reject chamber 12. To achieve a satisfactory dilution of thickened reject fraction, the passage 20 should open into the screen 4 at a distance from the reject discharging end of the screen 4 which is about 5% to 50% of the axial length of the screen 4.

Thus, the screening apparatus is provided with dilution liquid supply means comprising the above defined wall element 15, stationary circumferential wall 16, dilution liquid chamber 17 with its inlet 18, annular wall portion 19 and annular passage 20.

In operation, the fiber suspension to be separated is supplied to the central chamber 5 through the inlet 3 and flows along the screen 4 while separating into an accept fraction, which passes through the screen 4 into the accept chamber 6 and discharges therefrom through the accept outlet 10, and a reject fraction, which flows from the screen 4 into the reject chamber 12 and discharges therefrom through the reject outlet 11. By pulsating action of the rotating wing elements 8 the screen 4 is prevented from being clogged by fibers and/or contaminants. Dilution liquid, usually water, is supplied to the dilution liquid chamber 17 through the inlet 18. From chamber 17 the dilution liquid flows past the annular wall portion 19 and through the annular passage 20 flushing the screen 4, so that detrimental thickening of the reject fraction is prevented.

The annular passage 20 is kept clean by the rotation of the wall element 15 subjecting any particles present in the annular passage 20 to shearing action. In addition to this, the protrusion 21 on the rotor 7 pushes away any particles present in the annular passage 20 during each revolution of the rotor 7.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A screening apparatus for separating fiber suspensions comprising:

a housing including an interior and an inlet for said fiber suspension;

a stationary tubular screen having a first end, a second end, and an axial length therebetween dividing said interior of said housing into a central chamber for receiving said fiber suspension from said inlet and an outer accept chamber for receiving an accept portion of said fiber suspension which has passed through said stationary tubular screen;

a rotor journalled on said housing for rotation within said central chamber coaxially with said stationary tubular screen, said rotor including a rotationally symmetrical element, a reject chamber for receiving a reject portion of said fiber suspension at said second end of said stationary tubular screen; and dilution liquid supply means for supplying a dilution liquid to said central chamber, said dilution liquid supply means including a stationary annular wall portion extending in the radial direction and juxtaposed with said rotationally symmetrical element of said rotor thereby defining an annular passage for said dilution liquid, said stationary annular wall portion being spaced from said second end of said stationary tubular screen.

2. The screening apparatus of claim 1 wherein said annular passage faces said stationary tubular screen.

3. The screening apparatus of claim 2 wherein said annular passage faces said stationary tubular screen at a location spaced from said second end of said stationary tubular screen which corresponds to a distance between about 5% and 50% of said axial length of said stationary tubular screen.

4. The screening apparatus of claim 1 including a stationary circumferential wall substantially comprising an extension of said circumferential wall of said rotor, said stationary circumferential wall including said stationary annular wall portion, said stationary circumferential wall and said stationary annular wall portion defining a dilution liquid chamber in fluid communication with said annular passage.

5. The screening apparatus of claim 4 wherein said circumferential wall of said rotor and said stationary circumferential wall of said dilution liquid chamber are tapered in a direction toward said first end of said stationary tubular screen.

6. The screening apparatus of claim 1 wherein said rotationally symmetrical element includes at least one protrusion extending into said annular passage spaced from said stationary annular wall portion.

7. The screening apparatus of claim 1 wherein said annular passage includes an axial width, and wherein said axial width varies in a circumferential direction.

* * * * *